Figure 5:
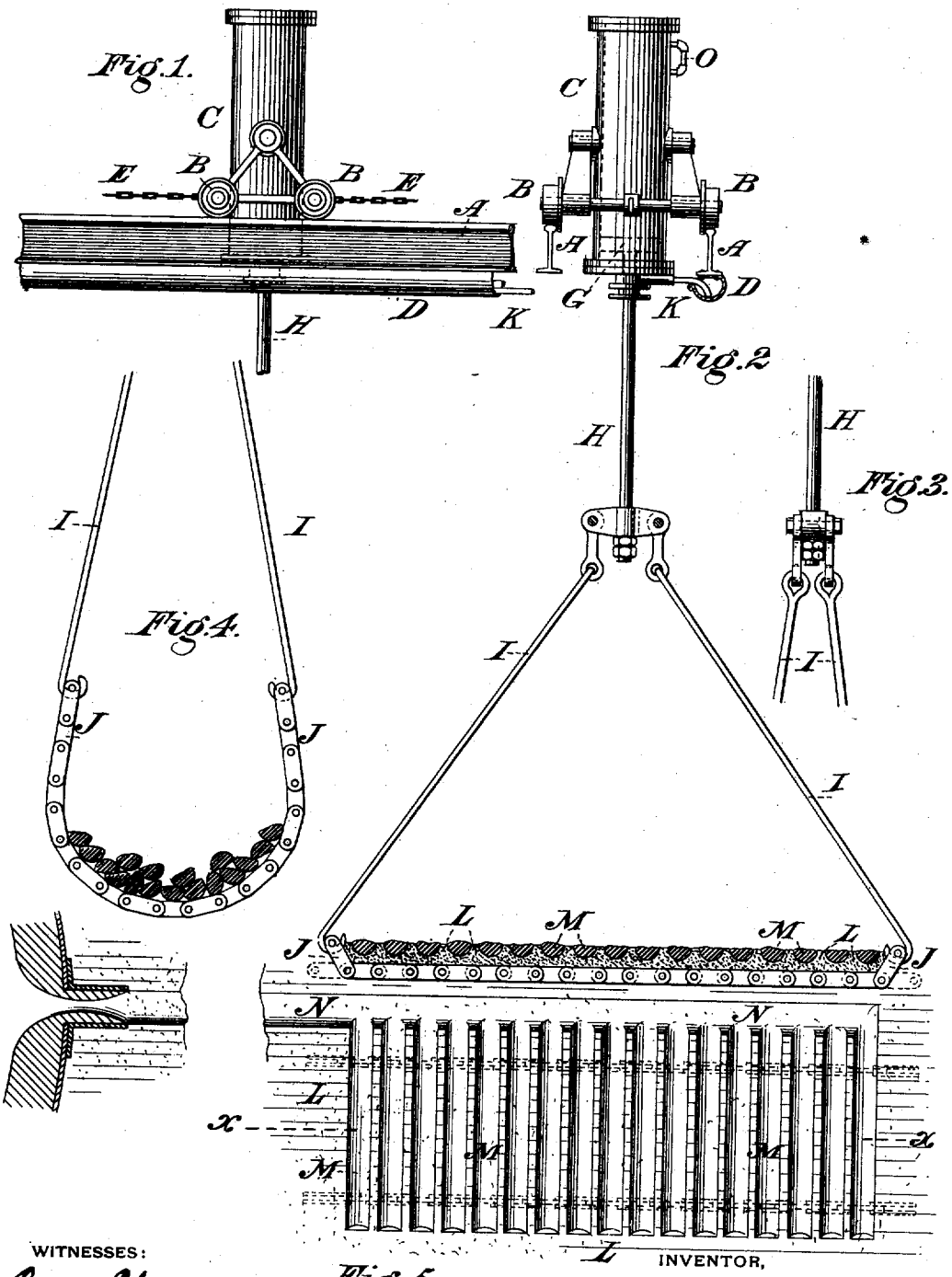

J. W. SEIGH.

HOISTING APPARATUS.

No. 10,829. Reissued Apr. 19, 1887.

WITNESSES:

C. M. Clarke

N. B. Corwin

INVENTOR,

John W. Seigh by Bakewell & Kerr

Att'ys

N. PETERS, Photo-Lithographer, Washington, D. C.

UNITED STATES PATENT OFFICE.

JOHN W. SEIGH, OF JOHNSTOWN, PENNSYLVANIA.

HOISTING APPARATUS.

SPECIFICATION forming part of Reissued Letters Patent No. 10,829, dated April 19, 1887.

Original No. 352,631, dated November 16, 1886. Application for reissue filed January 22, 1887. Serial No. 225,211.

*To all whom it may concern:*

Be it known that I, JOHN W. SEIGH, of Johnstown, in the county of Cambria and State of Pennsylvania, have invented a new and useful Improvement in Apparatus for Breaking and Hoisting Pig-Iron; and I do hereby declare the following to be a full, clear, and exact description thereof.

The object of my invention is to provide a hoisting apparatus which will not only raise pigs of cast-iron from the bed in which they are cast, but break them apart and convey them to any desired point without the necessity of the great manual labor which has heretofore been necessary for work of this kind.

In the accompanying drawings, Figure 1 is a side elevation of a hoisting apparatus. Fig. 2 is an end view of the same, showing the pig-bed in section on the line *x x* of Fig. 5. Fig. 3 is a detail. Fig. 4 illustrates the lifting of the pigs. Fig. 5 is a plan view of a portion of the floor of the casting-house, showing a pig-bed and the tapping-hole of the cupola or melting furnace.

A represents a stationary track, which is placed overhead in the casting-room, and which extends from above the different points where the pigs are cast to any desired point, either in the room or outside of it. Mounted upon this track, by means of the wheels B, is a vertical cylinder, C, of any desired length or diameter, and which is connected by means of a flexible steam-tube, K, with the boiler, which is located at any convenient point. This steam-tube, being made of any of the usual materials employed in making such tubes or pipes, would be readily destroyed by the heat from the castings if no means were taken to protect it. For this purpose to one of the rails of the track is secured a suitable trough, D, in which the tubing is supported, and which trough also serves to protect the tubing from the heat of the castings. This tubing, being flexible, readily follows the movement of the piston as it is being drawn toward either end of the track by means of the ropes, wires, or chains E, which are passed around guiding-drums located at opposite ends of the track. By pulling upon these wires, ropes, or chains the cylinder can be moved to any desired point in the casting-room.

In the cylinder is placed a piston, G, which has the piston-rod H connected to its under side, and which rod projects through the lower cylinder-head, as shown. To the lower end of this piston-rod are connected a number of grappling hooks, rods, or other suspension devices, I, which are adapted to be connected to the chains J, which are buried in the sand of the casting-bed. There may be any number of these rods I, and any number of chains to which they are connected. The chains being sunk in the sand of the casting bed or mold L, so as to extend directly under the pigs M, which are cast together in the usual manner with a sow, N, when steam is admitted to the cylinder its pressure against the under side of the piston forces the piston upward in the cylinder, and then the chains, being raised upward at their ends, not only raise the pigs out of their beds, but break them apart from the sow at the same time. This elevation of the pigs is to be performed while they are still heated, so that the sprues which connect the pigs together will be readily broken. When the chains begin to rise, they act on the end pigs first, so that the whole weight of the sow and of the other pigs acts against and resists the action of the chains, thereby rendering it easy for them to break off the pigs *seriatim* from the ends to the center. As the pigs are broken off they are are rolled or bundled toward the middle of the narrowing loops of the chains.

In order to prevent the piston being forced upward with sufficient force against the upper head of the cylinder to break or injure some of the parts, I make two holes through the side of the upper portion of the cylinder, and in these holes fasten the pipe O. A suitable distance is left between the ends of the pipe, so that after the piston has been raised above the lower end of the pipe steam will instantly pass through the pipe into the upper part of the cylinder and above the piston, and this steam will form a cushion to prevent the piston from striking against the upper cylinder-head. The steam is admitted to the upper portion of the cylinder only after the piston has been raised above or up to the lower end of the pipe.

Heretofore when the pigs have been cast they have had to be broken apart by workmen and then elevated one at a time from their beds and conveyed singly from the casting-room.

This requires the most severe and exhausting labor, and for this reason, as well as because of the great heat to which the workmen are subjected, only the very strongest laborers can be employed for this purpose. By means of my invention all of this labor is avoided, for it is only necessary to embed the chains in the sand before the pigs are cast, and then after the castings have been made connect them to the cylinder, admit the steam, and then draw the cylinder with its raised load toward the end of the foundry. It is apparent that while I have shown a steam-cylinder and track, any traveling hoisting device of sufficient strength and capable of use in the foundry will answer the purpose and may be used instead of the steam-cylinder. By the use of this invention two men to manipulate the chains and one boy to run the elevating-carrier can perform the work of seven men with the former method.

Having thus described my invention, I claim—

1. The combination of the movable cylinder provided with wheels which bear upon the track A, a protecting-trough which is secured to one of the rails of the track, and a flexible steam-tube which is connected at one end to the cylinder, and which is supported in and protected from the heat of the iron by the trough, substantially as shown.

2. The combination of the cylinder mounted upon wheels, the piston, the piston-rod, the grappling rods or hooks, and the chains, which are to be sunk in the sand bed before the castings are made, substantially as described.

3. The combination of the track, the cylinder mounted on wheels and placed upon the track, the piston provided with grappling rods or hooks, the chains, and the short pipe O, connected at both ends to the upper portion of the cylinder, and which only admits steam to the top of the cylinder to form a cushion for the piston when the piston reaches a certain height in the cylinder, substantially as set forth.

4. The combination of a pig bed or mold, chains embedded therein, suspension devices, and an elevating and conveying mechanism, whereby pigs of iron cast in the bed or mold can be broken apart, raised, and conveyed to the desired place of deposit, substantially as and for the purposes described.

In testimony whereof I have hereunto set my hand this 12th day of January, A. D. 1887.

JOHN W. SEIGH.

Witnesses:
ALVAR AKERS,
NATHANIEL BUTLER.